United States Patent
Curley et al.

(10) Patent No.: US 11,704,280 B2
(45) Date of Patent: *Jul. 18, 2023

(54) METHODS FOR REPLICATING DATA AND ENABLING INSTANTANEOUS ACCESS TO DATA AND DEVICES THEREOF

(71) Applicant: NetApp Inc., Sunnyvale, CA (US)

(72) Inventors: Jonathan Curley, Pittsburgh, PA (US); Srishylam Simharajan, Cranberry Township, PA (US); Devang Shah, San Jose, CA (US); Richard Jernigan, Sewickely, PA (US)

(73) Assignee: NetApp, Inc., San Jose, CA (US)

( * ) Notice: Subject to any disclaimer, the term of this patent is extended or adjusted under 35 U.S.C. 154(b) by 1069 days.

This patent is subject to a terminal disclaimer.

(21) Appl. No.: 15/711,451

(22) Filed: Sep. 21, 2017

(65) Prior Publication Data

US 2018/0011862 A1 Jan. 11, 2018

Related U.S. Application Data

(63) Continuation of application No. 14/522,820, filed on Oct. 24, 2014, now Pat. No. 9,773,004.

(51) Int. Cl.
  *G06F 16/11* (2019.01)
  *G06F 16/182* (2019.01)
  *G06F 3/06* (2006.01)

(52) U.S. Cl.
  CPC .......... *G06F 16/122* (2019.01); *G06F 3/0647* (2013.01); *G06F 16/119* (2019.01); *G06F 16/1844* (2019.01)

(58) Field of Classification Search
  None
  See application file for complete search history.

(56) References Cited

U.S. PATENT DOCUMENTS

| 4,603,380 | A | 7/1986 | Easton et al. |
| 5,751,289 | A | 5/1998 | Myers |
| 6,681,303 | B1 * | 1/2004 | Watanabe ........... G06F 11/1451 711/162 |
| 6,779,094 | B2 | 8/2004 | Selkirk et al. |

(Continued)

OTHER PUBLICATIONS

Moulton S., "NetApp Data Compression and Deduplication Deployment and Implementation Guide," Clustered Data ONTAP, NetApp Technical Report, Feb. 2014, pp. 1-90.

(Continued)

*Primary Examiner* — Amresh Singh
(74) *Attorney, Agent, or Firm* — Cooper Legal Group, LLC

(57) ABSTRACT

A method, non-transitory computer readable medium, and device that replicates data and provides instantaneous access to data includes receiving in a destination volume one or more named data extents and one or more references to the one or more named data extents associated with a file in parallel from a source volume. A determination is made to check whether the one or more references arrive before the one or more named data extents arrive. Each of the received one or more references which are determined to have arrived prior to the one or more data extents is allocated as absent by the storage management computing device. An instantaneous access to the file is provided during the allocation.

20 Claims, 4 Drawing Sheets

(56) References Cited

U.S. PATENT DOCUMENTS

| | | |
|---|---|---|
| 7,293,030 B2 | 11/2007 | Lanzatella et al. |
| 7,873,619 B1 | 1/2011 | Faibish et al. |
| 8,930,311 B1 | 1/2015 | Wang et al. |
| 8,983,952 B1 | 3/2015 | Zhang et al. |
| 9,052,938 B1 | 6/2015 | Bhide et al. |
| 9,075,755 B1 | 7/2015 | Haase et al. |
| 9,317,224 B1 | 4/2016 | Aharoni et al. |
| 9,396,205 B1 | 7/2016 | Lewis et al. |
| 2005/0060643 A1 | 3/2005 | Glass et al. |
| 2010/0088134 A1 | 4/2010 | Nielsen et al. |
| 2010/0153617 A1 | 6/2010 | Miroshnichenko et al. |
| 2011/0282835 A1* | 11/2011 | Cannon ................ G06F 16/119 707/622 |
| 2013/0073519 A1* | 3/2013 | Lewis .................... G06F 3/067 707/610 |
| 2013/0080389 A1* | 3/2013 | Curley ................ G06F 16/128 707/639 |
| 2013/0159360 A1 | 6/2013 | Miyamae et al. |
| 2014/0173226 A1 | 6/2014 | Gold |
| 2014/0250093 A1* | 9/2014 | Prahlad ................ G06F 9/455 707/696 |
| 2015/0269032 A1 | 9/2015 | Muthyala et al. |
| 2015/0278243 A1 | 10/2015 | Vincent et al. |
| 2016/0259351 A1 | 9/2016 | Barrett et al. |

OTHER PUBLICATIONS

Non-Final Office Action cited in U.S. Appl. No. 14/522,820 dated Sep. 28, 2016, 20 pgs.

Reply Non-Final Office Action cited in U.S. Appl. No. 14/522,820 dated Dec. 20, 2016, 9 pgs.

Final Office Action cited in U.S. Appl. No. 14/522,820 dated Feb. 2, 2017, 18 pgs.

Reply Final Office Action cited in U.S. Appl. No. 14/522,820 dated Apr. 3, 2017, 11 pgs.

Advisory Action cited in U.S. Appl. No. 14/522,820 dated Apr. 12, 2017, 3 pgs.

Notice of Allowance cited in U.S. Appl. No. 14/522,820 dated May 12, 2017, 13 pgs.

Amendment after Notice of Allowance cited in U.S. Appl. No. 14/522,820 dated Aug. 14, 2017, 8 pgs.

* cited by examiner

METHODS FOR REPLICATING DATA AND ENABLING INSTANTANEOUS ACCESS TO DATA AND DEVICES THEREOF

RELATED APPLICATIONS

This application claims priority to and is a continuation of U.S. application Ser. No. 14/522,820, filed on Oct. 24, 2014, now allowed, titled "METHODS FOR REPLICATING DATA AND ENABLING INSTANTANEOUS ACCESS TO DATA AND DEVICES THEREOF," which is incorporated herein by reference.

FIELD

This technology relates to providing instantaneous access to data and, more particularly, methods for replicating data and enabling instantaneous access to data and devices thereof.

BACKGROUND

Use of storage systems to store data has become widespread, and many store large amounts of data using multiple storage devices. Data stored at such storage systems may include user files, applications, application data and metadata that include information descriptive of the data. For purposes of storage efficiency, data is stored once and then referenced multiple times.

As the amount of data stored in the data storage systems increases, management of the data becomes more difficult. For example, a portion of the data may be logically replicated from the first storage system to the second storage system so that multiple copies of the data can be maintained as backups. With logical replication, the data and the references to the data can be sent in parallel. However, when the references to the data arrive before the actual data, existing technologies performs pulling and buffering techniques to replace the references with the actual data when the actual data arrives. Unfortunately, these pulling and buffering techniques used by the existing technologies have resulted in undesirable delays to the replication transfer time, thereby causing delay to the user to access the replicated data. Additionally, the existing pulling and buffering techniques have resulted in reduced efficiency of the CPU.

SUMMARY

A method for replicating data and providing instantaneous access to data includes receiving in a destination volume by a storage management computing device one or more named data extents and one or more references to the one or more named data extents associated with a file in parallel from a source volume. A determination is made to check whether the one or more references arrives before the one or more named data extents arrive by the storage management computing device. Each of the received one or more references which are determined to have arrived prior to the one or more data extents is allocated as absent by the storage management computing device. An instantaneous access to the file is provided by the storage management computing device during the allocation.

A non-transitory computer readable medium having stored thereon instructions for replicating data and providing instantaneous access to data comprising executable code which when executed by a processor, causes the processor to perform steps including receiving in a destination volume one or more named data extents and one or more references to the one or more named data extents associated with a file in parallel from a source volume. A determination is made to check whether the one or more references arrives before the one or more named data extents arrive. Each of the received one or more references which are determined to have arrived prior to the one or more data extents is allocated as absent by the storage management computing device. An instantaneous access to the file is provided during the allocation.

A storage management computing device includes a memory coupled to a processor configured to execute programmed instructions stored in the memory including receiving in a destination volume one or more named data extents and one or more references to the one or more named data extents associated with a file in parallel from a source volume. A determination is made to check whether the one or more references arrive before the one or more named data extents arrive. Each of the received one or more references which are determined to have arrived prior to the one or more data extents is allocated as absent by the storage management computing device. An instantaneous access to the file is provided during the allocation.

This technology provides a number of advantages including providing methods, non-transitory computer readable medium and devices for replicating data and providing instantaneous access to the data. By using absent allocation when the reference to the named data extent arrives before the content of the data extent, this technology is able to avoid the requirement for pulling or buffering of data. Additionally, this technology enables greater parallelism by providing instantaneous access to data while data replication is being performed.

DETAILED DESCRIPTION

Figure 1:
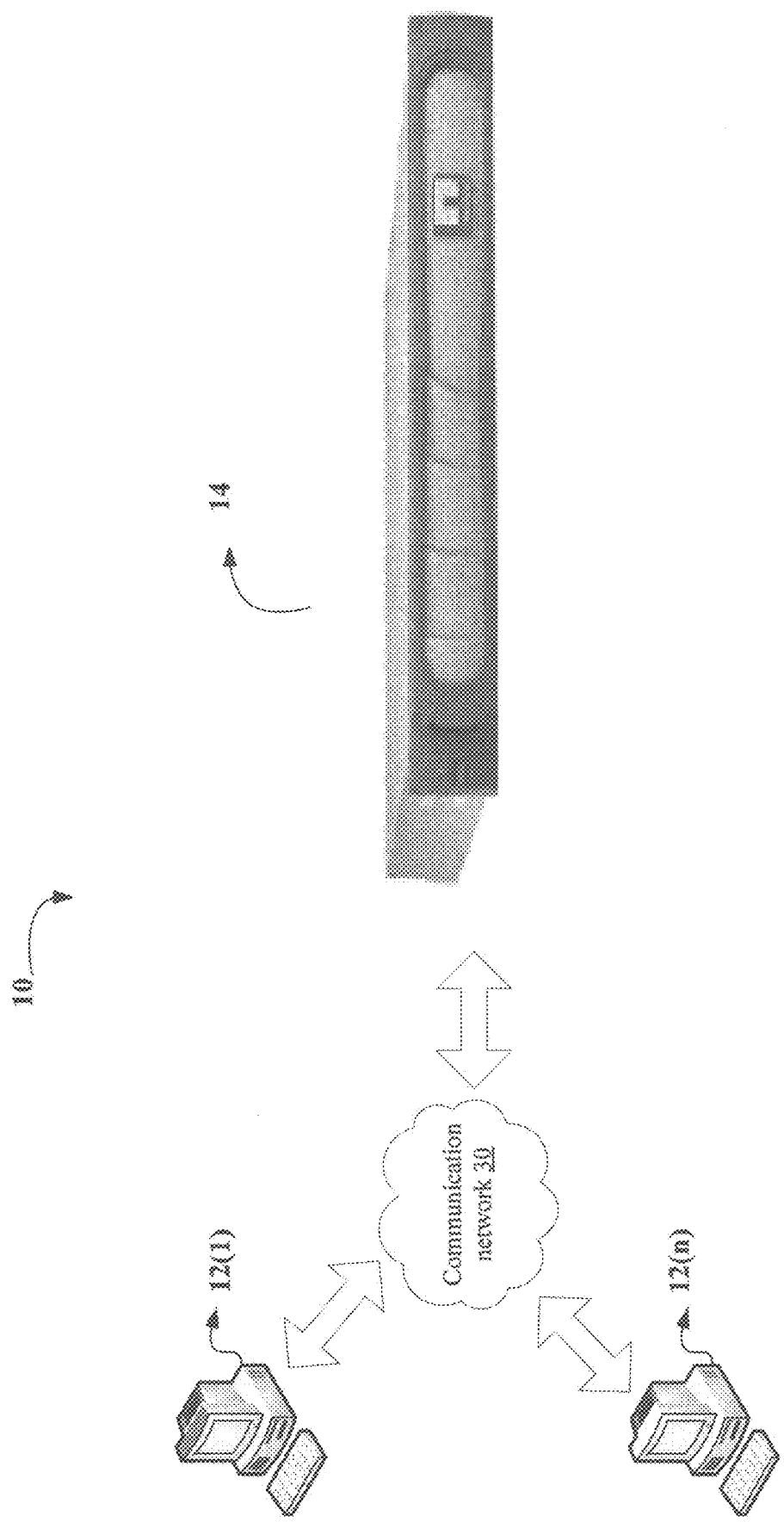
FIG. 1 is a block diagram of an environment with an exemplary storage management computing device.
Figure 2:
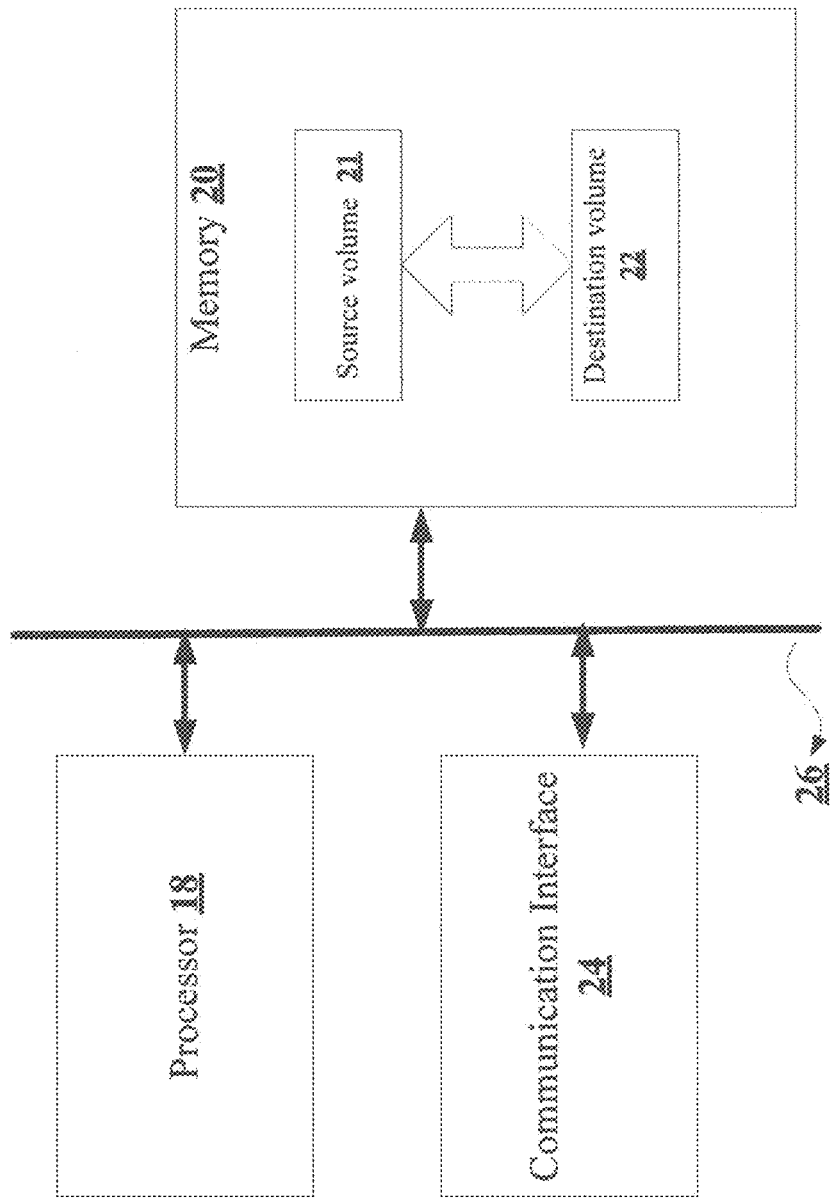
FIG. 2 is a block diagram of the exemplary storage management computing device shown in FIG. 1.
Figure 3:
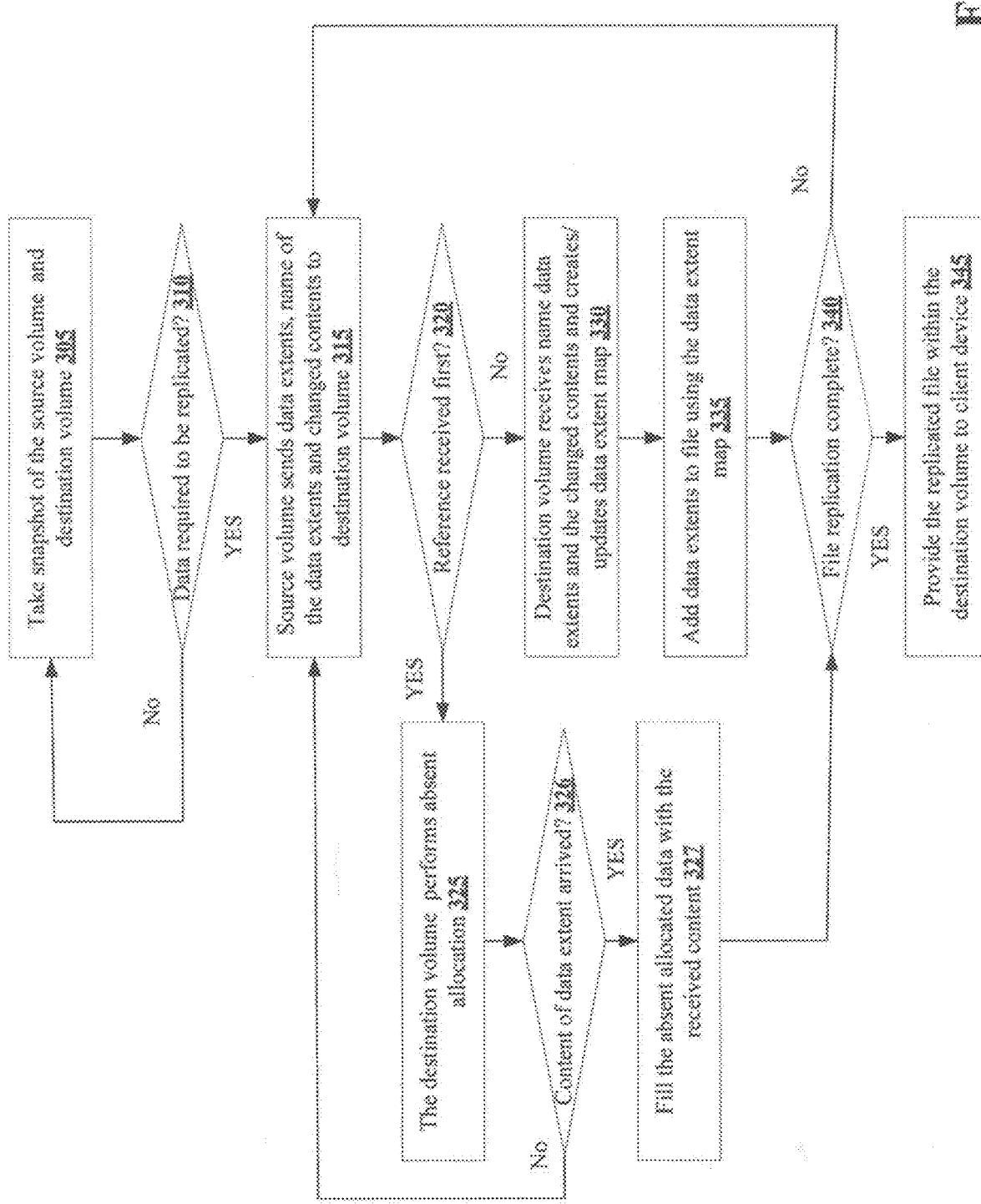
FIG. 3 is a flow chart of an example of a method for replicating data and providing instantaneous access to data.

An environment 10 with a plurality of client computing devices 12(1)-12(n) and an exemplary storage management computing device 14 is illustrated in FIGS. 1-2. In this particular example, the environment 10 includes a plurality of client computing devices 12(1)-12(n) and the storage management computing device 14 coupled via one or more communication networks 30, although the environment could include other types and numbers of systems, devices, components, and/or other elements. In this example, the method for replicating data and providing instantaneous access to data is executed by the storage management computing device 14 although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable medium and devices for replicating data and providing instantaneous access to data.

Referring more specifically to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for replicating data and providing instantaneous access to data as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20. Additionally, as illustrated FIG. 2, the memory 20 includes a source volume 21 and a destination volume 22, although the volumes can be stored in other systems or devices in other locations and could be serviced by multiple computing devices. In this example, the source volume 21 and the destination volume 22 includes data that can be modified, deleted, created, moved, and/or copied by the plurality of client computing devices 12(1)-12(n).

The communication interface 24 of the storage management computing device 14 operatively couples and communicates with the plurality of client computing devices 12(1)-12(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, an interface device, and an I/O system, which are coupled together by a bus or other link, although other numbers and types of network devices could be used. The plurality of client computing devices 12(1)-12(n) communicates with the storage management computing device 14 for requesting access to data, although the client computing devices 12(1)-12(n) can interact with the storage management computing device 14 for other purposes. By way of example, the plurality of client computing devices 12(1)-12(n) may run interface application(s) that may provide an interface to make requests to access, modify, delete, edit, read or write data within the source volume 21 and the destination volume 22 via the communication network 30. In this example, the data within the source volume 21 and the destination volume 22 is stored in form of data blocks, although the data can be stored in other formats.

Although the exemplary network environment 10 includes the plurality of client computing devices 12(1)-12(n) and the storage management computing device 14 described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An exemplary method for replicating data and providing instantaneous access to data will now be described with reference to FIGS. 1-4.

In step 305, the storage management computing device 14 takes a snapshot of the source volume 21 and the destination volume 22. In this example, the term snapshot generally relates to a read-only image of a file system at a point in time and is stored on the same storage device of the file system and is accessible to users of the storage management computing device 14 and the client computing devices 12(1)-12(n). By way of example only, the storage management computing device 14 takes a snapshot of the source volume 21 and a snapshot of the destination volume 22 at a particular instant of time to replicate the a file within the source volume 21 and the destination volume 22, although the storage management computing device 14 can replicate directories, symbolic links and other file system constructs.

In step 310, the storage management computing device 14 determines whether a file needs to be replicated from the source volume 21 to the destination volume 22, although the storage management computing device 14 can replicate directories, symbolic links and other file system constructs. In this example, the storage management computing device 14 compares the snapshots of the source volume 21 and the destination volume 22 to determine whether the data is required to be replicated, although the storage management computing device 14 can use other techniques for replication of data. By way of example, the data from the source volume 21 may required to be replicated to the destination volume 22 when the source volume 21 has a file having data that has been changed when compared to a copy of the file stored in the destination volume 22, although data may be required to be replicated for different purposes. Accordingly, if the storage management computing device 14 determines that the file is not required to be replicated, then the No branch is taken to step 305 to take another snapshot of the source volume 21 and the destination volume 22 at the next periodic time interval. However, if the storage management computing device 14 determines that the file is required to be replicated, then the Yes branch is taken to step 315.

In step 315, the storage management computing device 14 identifies and sends the changed data extents along with the names of the data extents and references to these named data extents in parallel to the destination volume 22, although the source volume 21 can send other types or amounts of information to the destination volume 22. In this example the term data extent relates to representation of data in a generic format transmitted as memory blocks. For purpose of further illustration with reference to FIG. 4, the storage management computing device 14 creates data extents by name X, Y and Z and also assigns generic or repetitive data to each of the created data extents names, although the storage management computing device 14 can assign other types of data to the named data extents. This generic or repetitive data is a part of the changed contents of the files, although the generic or repetitive data can include other types or amounts of information. By assigning a name to the data extents, the technology provides advantages of allowing the storage management computing device 14 to send the named data extents from the source volume 21 once and refer to the same named data extent multiple times for further data replications thereby resulting in quicker and efficient data replication. Additionally, the storage management computing device 14 also sends from the source volume 21 the metadata associated with the file to be written in the destination volume 22. By way of example only, the metadata of the file includes information associated with the file such as the layout of the file, the size of the file, format of the file, length of the contents to be changed, although the metadata can include other types or amounts of information associated with the file such as buffer tree and container file.

Next in step 320, the storage management computing device 14 determines whether reference to each of the named data extents arrives before contents of each of the named data extents as both the contents of the named data extents and the references are sent in parallel from the source volume 21. In this example, the storage management computing device 14 is required to determine whether the reference to data extents has arrived at the destination volume 22 before the contents of the data extents because the data to file may not be able to be written within the destination volume 22 when there is only a reference (named data extent) to the data and the actual referred data (content of the named data extent) has not yet arrived. By way of example only, the storage management computing device 14 determines that the reference to the named data extents has arrived at the destination volume 22 before the content of the named data extents when the storage management computing device 14 begins to write the changes to the file within the destination volume 22, although the storage management computing device 14 can use other techniques to make the determination. Accordingly, if in step 320 the storage management computing device 14 determines that the reference to each of the data extents has arrived before the content of each of the data extents, then the Yes branch is taken to step 325.

In step 325, the storage management computing device 14 performs an absent allocation of the data. In this example, the storage management computing device 14 performs the absent allocation of the data based on the metadata, such as file layout associated with the file to be written in the destination volume 22, although the storage management computing device 14 can perform absent allocation using other number and/or types of parameters and/or in other manners. In this example, the storage management computing device 14 performs absent allocation using by way of example only a technique illustrated and described in US Patent Application Publication No. 2013/0080389 A1, entitled "Allocation of Absent Data Within File Systems", which is incorporated here in its entirety, although the storage management computing device 14 can use other techniques to perform absent allocation.

Next in step 326, the storage management computing device 14 determines whether the missing content of the data extent has been received by the destination volume 22. If the storage management computing device 14 determines that the missing content of the data extent has not been received, then the No branch is taken back to step 315. If the storage management computing device 14 determines that the missing content of the data extent has been received, then the Yes branch is taken to step 327.

In step 327, the storage management computing device 14 writes the received content of the data extent into the locations in the file within the destination volume 22 at which the named data extent has been referenced, although the received content of the data extent can be written into other locations within the file.

If back in step 320 the storage management computing device 14 determines that the content of each of the data extents is received before the reference to each of the data extents, then the No branch is taken to step 330.

Figure 4:
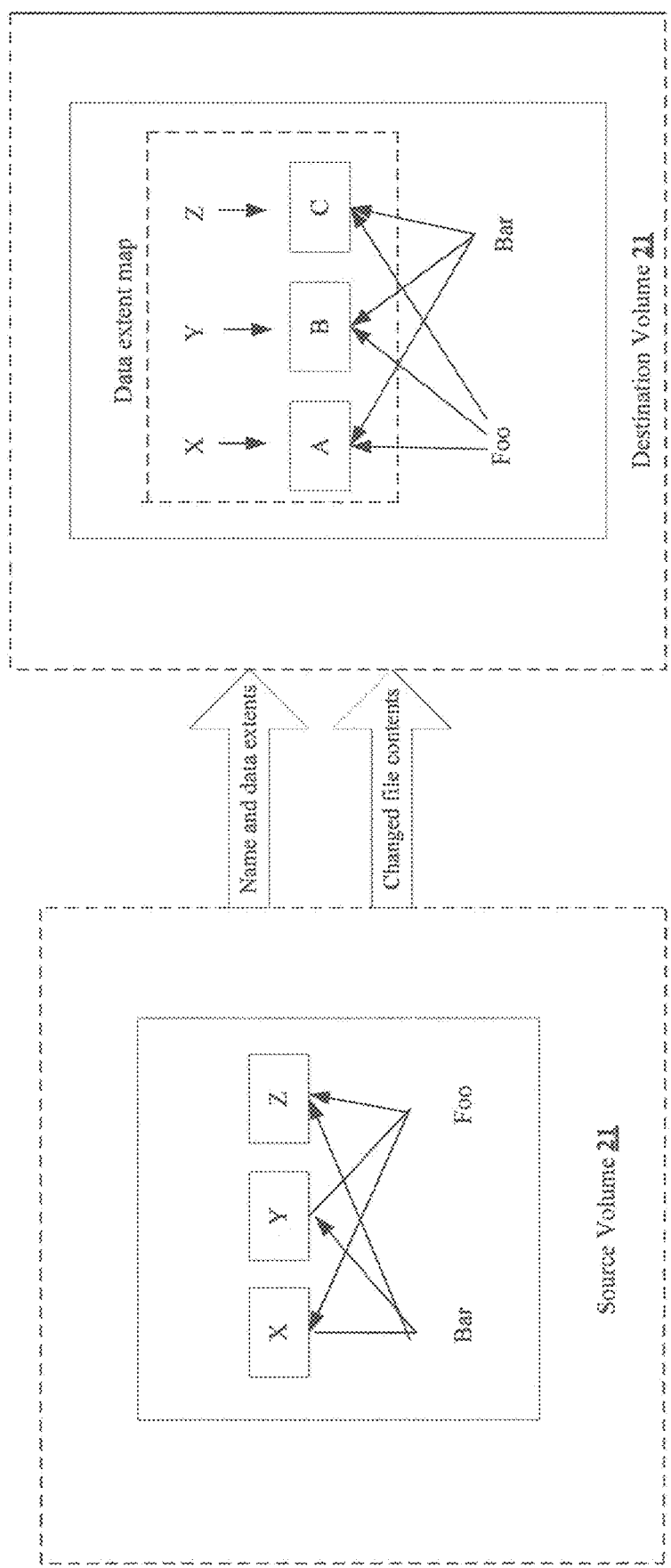
FIG. 4 is an exemplary functional block diagram of data replication between a source volume and a destination volume within the storage management computing device.

In step 330, upon receiving the named data extents in parallel with the changed contents at the destination volume 22, the storage management computing device 14 updates the data extent map as illustrated in FIG. 4. Alternatively in another example, the storage management computing device 14 can also create a new data extent map. In this example, the data extent map relates to having mapping between the received named data extents and the corresponding local data extents present within the destination volume 22. For further illustration with reference to FIG. 4, the destination volume 22 maps the received named data extents X, Y and Z from the source volume 21 with the corresponding local data extents A, B and C.

In step 335, the storage management computing device 14 resolves the names of the data extents using the updated data extent map and adds the content of the data extents to the file at locations wherein the name data extents is being referenced in the destination volume 22 as directed by the source volume 21.

In step 340, the storage management computing device 14 determines whether the replication of the file within the destination volume 22 has been completed. In this example, the replication of the file is determined to be completed when all the changes has been completely written to the file within the destination volume 22 and all the absent allocated data has been written within the corresponding content. Accordingly, if the storage management computing device 14 determines that the replication of the file has not been completed, then the No branch is taken back to step 315 where the destination volume 22 continues to receive the named data extents, contents of the data extents and other instructions from the source volume 21. However, if the storage management computing device 14 determines that the file has been replicated, then the Yes branch is taken to step 345.

In step 345, the storage management computing device 14 provides the file within the destination volume 22 upon receiving a request to read, write, edit, modify or delete from the plurality of client computing devices 12(1)-12(n), although the storage management computing device 14 can also provide file stored within the source volume 21 and the exemplary method ends.

Accordingly, as illustrated and described with reference to the examples herein, this technology provides methods, non-transitory computer readable medium and devices that provides efficient replication of data and providing instantaneous access to the requested data by processing the named data extents and the references to the named data extents in parallel.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

identifying and replicating data extents with names of the data extents and references to the data extents in parallel from a first volume to a second volume;

determining that a reference and metadata are received before data content of a data extent of a file being replicated, wherein the reference corresponds to a name assigned to the data extent, and wherein the metadata specifies a file layout of the file, a size of the file, a format of the file, and a length of changed content of the file, wherein a storage management system performs data replication by sending the data extent once and subsequently refers to the replicated data extent at the second volume multiple times during subsequent data replication;

in response to the reference being received before the data content, performing an absent allocation for the data extent at the second volume to create absent allocated data within the second volume based upon the reference and the metadata such that clients are provided with I/O access to the file before receipt of the data content, wherein the absent allocation takes the metadata as parameters, and wherein the file layout within the metadata is used as a parameter for the absent allocation;

in response to receiving the data content of the data extent, filling the absent allocated data with the data content;

in response to receiving the data extents and the references in parallel, populating a data extent mapping that maps references of received data extents from the first volume to corresponding data contents of local data extents in the second volume; and evaluating the data extent mapping to resolve names of data extents and to add data content of the data extends to files at locations where the data extents are referenced in the second volume as directed by the first volume.

2. The method of claim 1, comprising:

maintaining the data extent mapping between the references and the data contents stored within the second volume, wherein the data extent mapping maps the reference to the data content of the data extent.

3. The method of claim 2, comprising:

resolving the data extent based on the data extent mapping.

4. The method of claim 3, comprising:

adding the data extent at a referenced location, referenced by the reference, within the file stored in the second volume.

5. The method of claim 1, comprising:

adding the data content into the data extent of the file upon receipt of the data content after performance of the absent allocation.

6. The method of claim 5, wherein the adding comprises:

adding the data extent to the file based on information from the first volume.

7. A non-transitory computer readable medium having stored thereon instructions, which when executed by a processor, causes the processor to:

identify and replicate data extents with names of the data extents and references to the data extents in parallel from a first volume to a second volume;

determine that a reference and metadata are received before data content of a data extent of a file being replicated, wherein the reference corresponds to a name assigned to the data extent, and wherein the metadata specifies a file layout of the file, a size of the file, a format of the file, and a length of changed content of the file;

in response to the reference being received before the data content, perform an absent allocation for the data extent at the second volume to create absent allocated data within the second volume based upon the reference, the metadata, and the file layout of the file such that clients are provided with I/O access to the file before receipt of the data content, wherein the absent allocation takes the metadata as parameters, and wherein the file layout within the metadata is used as a parameter for the absent allocation;

in response to receiving the data content of the data extent, fill the absent allocated data with the data content;

in response to receiving the data extents and the references in parallel, populate a data extent mapping that maps references of received data extents from the first volume to corresponding data contents of local data extents in the second volume; and evaluate the data extent mapping to resolve names of data extents and to add data content of the data extends to files at locations where the data extents are referenced in the second volume as directed by the first volume.

8. The non-transitory computer readable medium of claim 7, comprising:
maintaining the data extent mapping between the references and the data contents stored within the second volume, wherein the data extent mapping maps the reference to the data content of the data extent.

9. The non-transitory computer readable medium of claim 8, comprising:
resolving the data extent based on the data extent mapping.

10. The non-transitory computer readable medium of claim 9, comprising:
adding the data extent at a referenced location, referenced by the reference, within the file stored in the second volume.

11. The non-transitory computer readable medium of claim 7, comprising:
adding the data content into the data extent of the file upon receipt of the data content after performance of the absent allocation.

12. The non-transitory computer readable medium of claim 11, wherein the adding comprises:
adding the data extent to the file based on information from the first volume.

13. A computing device comprising:
a memory having stored thereon instructions; and
a processor coupled with the memory, the processor configured to execute the instructions to cause the processor to:
identify and replicate data extents with names of the data extents and references to the data extents in parallel from a first volume to a second volume;
determine that a reference and metadata are received before data content of a data extent of a file being replicated, wherein the reference corresponds to a name assigned to the data extent, and wherein the metadata specifies a file layout of the file, a size of the file, a format of the file, and a length of changed content of the file, wherein a storage management system performs data replication by sending the data extent once and subsequently refers to the replicated data extent at the second volume multiple times during subsequent data replication;
in response to the reference being received before the data content, perform an absent allocation for the data extent at the second volume to create absent allocated data within the second volume based upon the reference, the metadata, and the file layout of the file such that clients are provided with I/O access to the file before receipt of the data content, wherein the absent allocation takes the metadata as parameters, and wherein the file layout within the metadata is used as a parameter for the absent allocation; and
in response to receiving the data content of the data extent, fill the absent allocated data with the data content;
in response to receiving the data extents and the references in parallel, populate a data extent mapping that maps references of received data extents from the first volume to corresponding data contents of local data extents in the second volume; and
evaluate the data extent mapping to resolve names of data extents and to add data content of the data extends to files at locations where the data extents are referenced in the second volume as directed by the first volume.

14. The computing device of claim 13, wherein the instructions cause the processor to:
maintain a data extent mapping between references and data contents stored within the second volume, wherein the data extent mapping maps the reference to the data content of the data extent.

15. The computing device of claim 14, wherein the instructions cause the processor to:
resolve the data extent based on the data extent mapping.

16. The device as set forth in claim 15, wherein the instructions cause the processor to:
add the data extent at a referenced location, referenced by the reference, within the file stored in the second volume.

17. The computing device of claim 14, wherein the instructions cause the processor to:
create an entry within the data extent mapping to map first data content to a first reference for a first data extent replicated from the first volume to the second volume.

18. The computing device of claim 14, wherein the first volume is hosted by a first computing device.

19. The computing device of claim 13, wherein the instructions cause the processor to:
add the data content into the data extent of the file upon receipt of the data content after performance of the absent allocation.

20. The computing device of claim 19, wherein the instructions cause the processor to:
add the data extent to the file based on information from the first volume.

* * * * *